(12) United States Patent
Nakamura (10) Patent No.: US 6,842,521 B2
(45) Date of Patent: *Jan. 11, 2005

(54) METHOD AND APPARATUS TO CONTROL COPYING FROM A DRIVE DEVICE TO A DATA REPRODUCING DEVICE

(75) Inventor: Seiichi Nakamura, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 464 days.

This patent is subject to a terminal disclaimer.

(21) Appl. No.: 10/051,142

(22) Filed: Jan. 22, 2002

(65) Prior Publication Data

US 2002/0061105 A1 May 23, 2002

Related U.S. Application Data

(63) Continuation of application No. 08/817,903, filed as application No. PCT/JP96/03608 on Dec. 11, 1996, now Pat. No. 6,347,846.

(30) Foreign Application Priority Data

Jan. 8, 1996 (JP) .............................................. 8-000985

(51) Int. Cl.[7] .................................................. H04L 9/00
(52) U.S. Cl. ........................... 380/203; 705/57; 380/201
(58) Field of Search ................................. 380/203, 201, 380/200, 239; 705/57, 58

(56) References Cited

U.S. PATENT DOCUMENTS

| | | |
|---|---|---|
| 5,081,676 A | 1/1992 | Chou et al. |
| 5,222,137 A | 6/1993 | Barrett et al. |
| 5,319,705 A | 6/1994 | Halter |
| 5,337,357 A | 8/1994 | Chou et al. |
| 5,398,285 A | 3/1995 | Borgelt et al. |
| 5,416,842 A | 5/1995 | Aziz |
| 5,513,260 A | 4/1996 | Ryan |
| 5,604,800 A | 2/1997 | Johnson |
| 5,615,264 A | 3/1997 | Kazmierczak et al. |
| 5,719,937 A * | 2/1998 | Warren et al. .............. 380/203 |
| 5,719,938 A * | 2/1998 | Haas et al. ................... 705/52 |
| 5,784,460 A | 7/1998 | Blumenthal et al. |
| 5,923,754 A | 7/1999 | Angelo et al. |
| 6,347,846 B1 * | 2/2002 | Nakamura .................. 380/203 |

FOREIGN PATENT DOCUMENTS

| | | |
|---|---|---|
| CN | 1054693 A | 9/1991 |
| EP | 0674440 A2 | 9/1995 |
| JP | 61-72345 | 4/1986 |
| JP | 3-187067 | 8/1991 |
| JP | 6-4026 | 1/1994 |
| JP | 6-124539 | 5/1994 |
| JP | 6-181044 | 6/1994 |
| JP | 7-221751 | 8/1995 |
| JP | 7-235131 | 9/1995 |

OTHER PUBLICATIONS

Office Action, dated Apr. 27, 2004, from the Japanese Patent Office for Patent Application No. 2001–036025.

(List continued on next page.)

Primary Examiner—Matthew Smithers
(74) Attorney, Agent, or Firm—Pillsbury Winthrop LLP (57) ABSTRACT

A data copy control method is applied to a computer system that has a reproducing device which receives reproducing data read out by a drive device. A shared key is produced in the drive device and the reproducing device. The reproducing data in the drive device is enciphered using copy control data read out by the drive device and the shared key. The enciphered reproducing data and the copy control data are transferred to the reproducing device. The enciphered reproducing data is deciphered using the copy control data received by the drive device and the shared key.

13 Claims, 10 Drawing Sheets

OTHER PUBLICATIONS

"Conventional data encryption key (DEK) "packet"", File Formats Used by PGP 2.6, (May 22, 1994).

"Conventional key encrypted data packet", File Formats Used by PGP 2.6 (May 22, 1994).

DVD Copy Protection: An Agreement At Last? Protecting Intellectual Property Rights in the Age of Technology, Dana J. Parker.

"A Day at the DVD Forum: technical notes", DVD Forum, C. Fogg, Apr. 22, 1996.

"RSA: A Brief Breakdown", Ron Rivest, Adi Shamir; Leonard Adelman; 1977.

"Patenting Cryptography Systems" RSA FAQ topics #5 and #6.

"Exporting Cryptography Systems" RSA FAQ Topics #5 and #6.

"Public–Key Encryption", What is Public–Key Encryption, Oct. 30, 1996.

"Encryption", What is Encryption, Oct. 30, 1996.

"Multimedia PCS: Video" vol. 04; No. 10; p. 191, Oct. 1996.

"Public–Key vs. Private–Key"; Advantages and Disadvantages; Oct. 30, 1996.

Web Page; nbeng.com; re: DVD material, Oct. 21, 1996.

Schneier, Bruce, Applied Cryptography : Protocols, Algorithms, and Source Code in C. 10/95, p. 513.

Schneier, Bruce, Applied Cryptography : Protocols, Algorithms, and Source Code in C. 10/95. Chapter 8, Section 3.

Schneier, Bruce, Applied Cryptography : Protocols, Algorithms, and Source Code in C. Chapters 3 and 22, Oct. 1995.

* cited by examiner

METHOD AND APPARATUS TO CONTROL COPYING FROM A DRIVE DEVICE TO A DATA REPRODUCING DEVICE

This application is a continuation of U.S. application Ser. No. 08/817,903, filed Mar. 31, 1997, now U.S. Pat. No. 6,347,846, which, in turn, is the national phase of International Application PCT/JP96/03608, filed Dec. 11, 1996, which, in turn, claims priority from Japanese application No. 08-000985, filed Jan. 8, 1996, the contents of each of which are incorporated herein by reference.

BACKGROUND OF THE INVENTION

1. Field of the Invention

This invention relates to a copy control method and copy control apparatus applied to a data processing system having the function of reproducing and outputting data, such as movies or music, compressed by, for example, the MPEG 2 standard. Such data is referred to herein as "provided data."

The present invention relates to a copy control method and copy control apparatus which, when recording and reproducing the data recorded on a large capacity recording medium, such as a CD-ROM or a DVD (digital video disk), as copied data, enables the reproduction of the copied data to be controlled by the specific control information recorded on the medium.

The present invention relates to a method of and apparatus for controlling the copying of data supplied by communicating through a computer system having the function of receiving provided data, such as movies or music, via communication means and reproducing and outputting the provided data.

2. Description of Related Art

For systems that reproduce and output data supplied from the film industry or the music industry, compressed by the MPEG 2 standard, copy protection techniques are required to prevent unauthorized copying.

When providing data by computer systems that reproduce and output the data, it is essential to establish highly reliable copy protection techniques capable of preventing unauthorized copying. These copy protection techniques must not be capable of being broken by computer processing.

With conventional copy protection techniques of this type, copy protection data is also recorded on a recording medium, such as a CD-ROM on which the provided data has been recorded, and the copy protection data, together with the provided data, is read and transferred to a copy protection unit, which performs a copy protection process on the provided data, thereby preventing unauthorized copying.

In conventional copy protection techniques, however, the copy protection process is not carried out until the provided data recorded on the disk has been transferred to the copy protection unit. This permits intentional unauthorized copying of the provided data in a system configurations having a computer acting as a transfer unit between the disk reading unit and reproducing unit.

As described above, with a conventional system where the provided data is exchanged via a computer, a highly reliable copy protection technique capable of preventing unauthorized copying has not been established. When a computer system is used that enables part of the provided data to be selectively read into the computer and used this leads to the problem of permitting the unauthorized copying of all of the provided data.

SUMMARY OF THE INVENTION

It is, an object of the present invention to overcome the disadvantages in the prior art by providing a highly reliable copy control method and copy control apparatus that reliably prevents unauthorized copying even when a computer intervenes in the exchange of data supplied from a large capacity recording medium, or the like (the "medium").

Furthermore, it is an object of the present invention to provide a highly reliable copy control method and copy control apparatus that enable the medium to control copying ability arbitrarily on a provided data basis without showing key data used in enciphering and deciphering to a computer that intervenes in the exchange of data supplied from a medium. Such a copy control method and apparatus will always enable the use of the provided data through authorized copying.

In an embodiment of the present invention, when a device capable of copying, such as a computer, intervenes in the exchange of data supplied from a medium, the data read from the medium is enciphered by a specific key on the computer. It is then possible to control a decision as to whether to reproduce the copied data arbitrarily.

Furthermore, according to an embodiment of the present invention, a highly reliable copy control method and copy control apparatus enables a side having the medium to control reproduction of the copied data arbitrarily on a provided data basis without showing the key data used in enciphering and deciphering to a computer that intervenes in the exchange of data supplied from a medium. The copying control method and apparatus always enable the use of the provided data through authorized copying.

In an embodiment of the present invention, the action of recording the data supplied from the medium in a storage device, and reading and reproducing the recorded data is referred to as reproduction of the copied data.

Specifically, an embodiment of the present invention comprises, in a system provided with a drive for reading the data recorded on a large capacity recording medium, a data reproducing device for receiving the data read by the drive via data transfer means, reproducing the received data, and outputting the reproduced data, and means for recording the data transferred from the data transfer means as copied data. The data sent from the drive to the data transfer means is enciphered using the key data generated by the data reproducing device. Only the data reproducing device has the key data used in enciphering and is allowed to reproduce the copied data (i.e., is allowed to make a first generation copy).

Furthermore, an embodiment of the present invention comprises, in the above system, the drive and the data reproducing device each generating mutually related key data separately on the basis of random numbers, the drive enciphering the data to be outputted to the data transfer means using its self-generated key data, and the data reproducing device deciphering the data received from the data transfer means using its self-generated secondary key data, thereby permitting only the data reproducing device having the related key data to perform reproduction without giving to the data transfer means the key data used in enciphering and deciphering and disabling the reproduction of the copied data.

Furthermore, an embodiment of the present invention comprises, in the system, the drive and the data reproducing device recognizing the copy permission level on the basis of the specific control data recorded on the large capacity recording medium. When the recognized level is the level permitting the copied data to be reproduced, the data read by the drive is given to the data transfer means without enciphering. When the recognized level is the level permitting only a specific data reproducing device to reproduce the copied data, the data read by the drive is enciphered using the key data generated by the data reproducing device that is to perform reproduction and the enciphered data is given to the data transfer. When the recognized level is the level inhibiting the reproduction of the copied data, the drive and the data reproducing device temporarily generate mutually related key data using random numbers, thereby enabling only the data reproducing device having the related key data to reproduce the data read by the drive and disabling all of the data reproducing devices including one having the related key data from reproducing the copied data.

Furthermore, an embodiment of the present invention comprises, in a system including a data providing device for providing data via communication means, a data reproducing device for receiving data from the data providing device via the communication means, reproducing the received data, and outputting the reproduced data, and means for recording the data provided to the data reproducing device via the communication means as copied data. The data providing device receives key data from the data reproducing device and on the basis of the key data, enciphers the data to be given to the data reproducing device, thereby enabling only the data reproducing device having the key data used in enciphering to reproduce the copied data.

Furthermore, an embodiment of the present invention comprises, in the above system, the data providing device and the data reproducing device generating mutually related key data separately using random data, the data providing device enciphering the data to be sent to the data reproducing device using its self-generated enciphering key data, and the data reproducing device deciphering the data received from the data providing device using its self-generated deciphering key data, thereby enabling the data received via the communication means to be reproduced and disabling the copied data from being reproduced.

Furthermore, an embodiment of the present invention comprises, in the system, the data providing device sending copy permission data specifying the permission level of copied data to the data reproducing device, and the data reproducing device recognizing the permission level of the copy of the provided data on the basis of the copy permission data received from the data providing device. When the recognized level is the permission level enabling the copied data to be reproduced, the data to be provided is given without enciphering to the data reproducing device via the communication means. When the recognized level is the permission level enabling only a specific data reproducing device to reproduce the copied data, the key data is received from the data reproducing device and the provided data enciphered on the basis of the key data is given to the data reproducing device via the communication means, and when the recognized level is the permission level inhibiting the copied data from being reproduced, the data providing device and the data reproducing device temporarily generate mutually related key data using random data, and the provided data enciphered on the basis of the key data is given to the data reproducing device via the communication means.

With the aforementioned copy control mechanisms, even in a system where a device capable of copying, such as a computer, intervenes in the exchange of the data supplied by a large capacity recording medium, a communication medium, or the like, it is possible to construct a highly reliable system which enables the medium side to control the reproduction of the copied data on the provided data basis without showing the key data used in enciphering and deciphering to an intervening computer, and which always enables the provided data to be used in the form of an authorized copy.

DETAILED DESCRIPTION OF THE INVENTION

Hereinafter, referring to the accompanying drawings, embodiments of the present invention will be explained.

Figure 1:
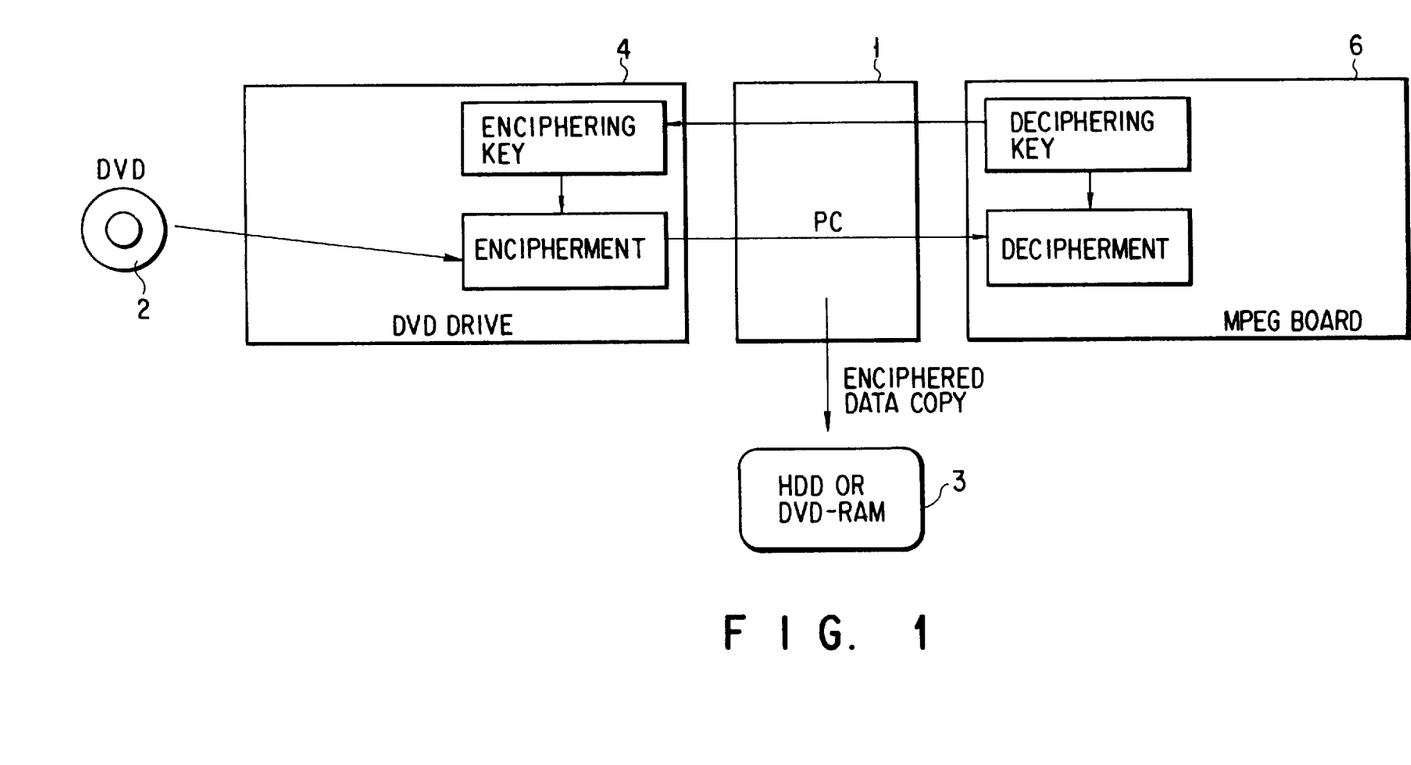
FIG. 1 is a block diagram of a basic system configuration according to a first embodiment of the present invention.

FIG. 1 is a block diagram showing the basic system configuration according to a first embodiment of the present invention. The figure illustrates an embodiment that permits a first-generation copy in such a manner that, with the provided data, such as movies or music, recorded on a large capacity storage medium (DVD2) being the object of copy protection, only a data reproducing unit (MPEG board 6) having the enciphered key data is allowed to copy and reproduce the data read by a drive (DVD drive 4) by enciphering the provided data supplied from the drive (DVD drive 4) to data transfer means (PC1), using the key data generated in the data reproducing unit (MPEG board 6).

In FIG. 1, a computer (PC) 1 transfers or supplies the provided data read by the drive to the data reproducing unit. The computer 1 selectively takes in the copy-permitted provided data read by the drive, stores it in an external storage unit 3, such as an HDD or a DVD-RAM, and enables processes, including editing and correction.

Figure 7:
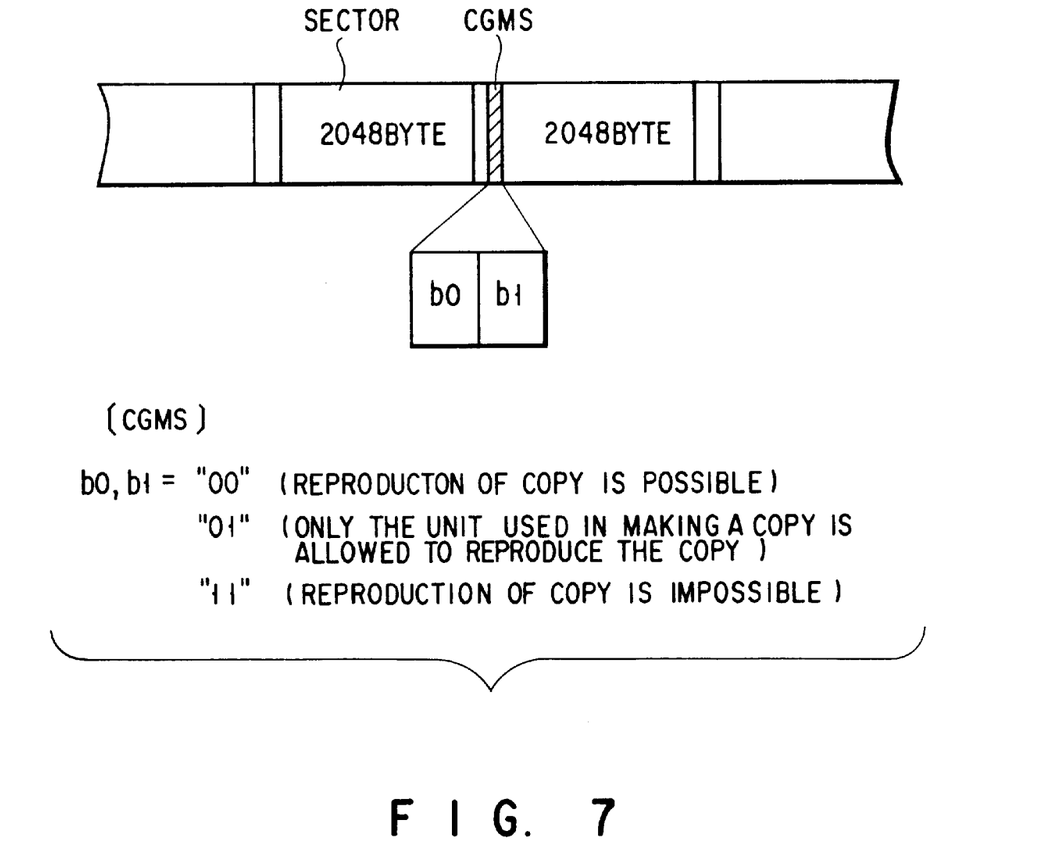
FIG. 7 shows a data format to help explain in the copy permission data (CGMS) in the media file management data block recorded on the data recording medium 20 in the embodiment of the present invention.

A DVD disk 2 stores provided data, such as movies or music, that is the object of copy protection. On the DVD 2, not only the provided data is compressed and recorded by, for example, the MPEG 2 scheme, but also the copy permission data (CGMS) as shown in FIG. 7 is recorded in part of the media file management data block so as to correspond to the provided data.

Figure 2:
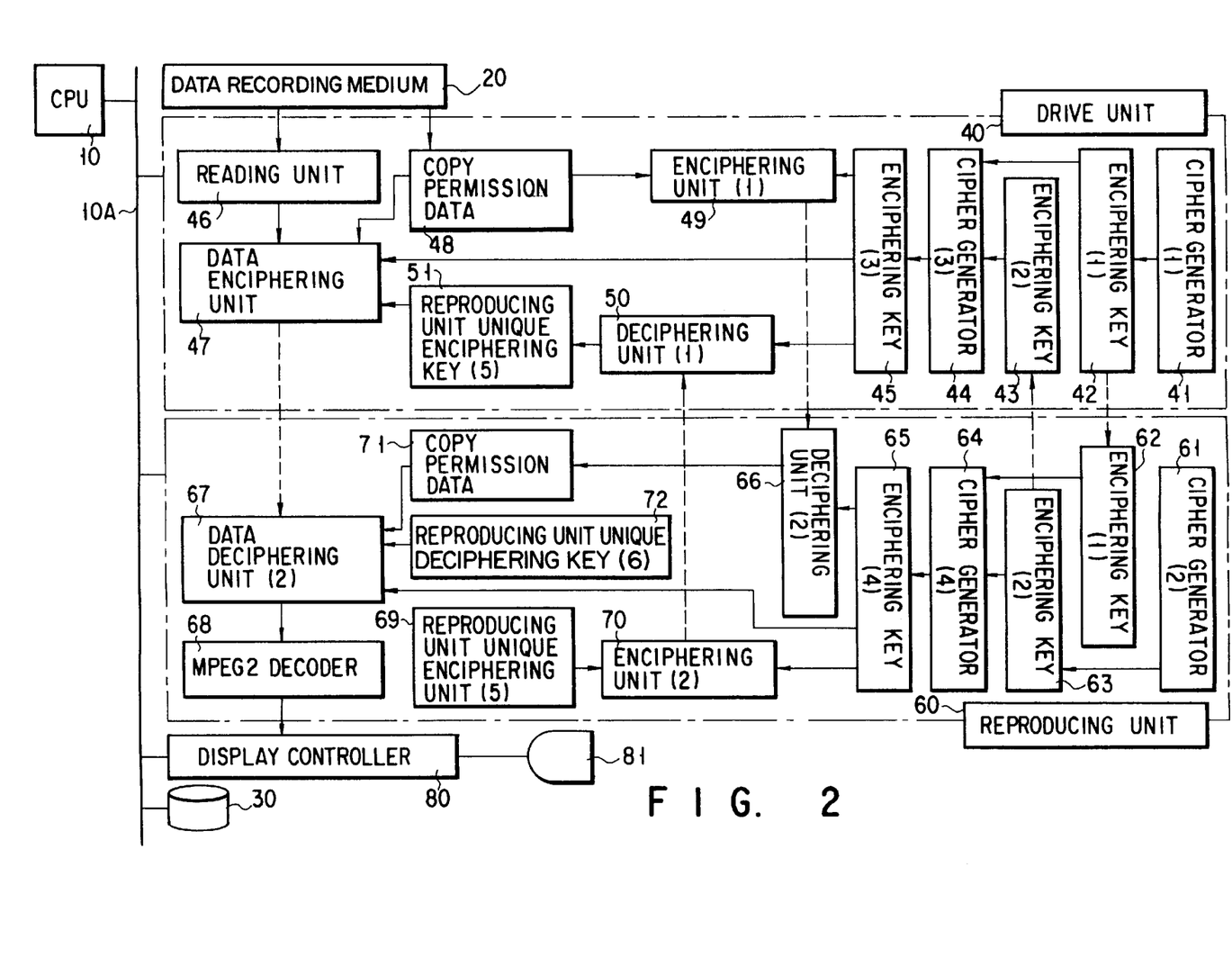
FIG. 2 is a block diagram of a system configuration according to a second embodiment of the present invention.

A drive unit 4 reads the data from the DVD 2. The drive unit 4 is referred to as the DVD drive. The DVD drive 4 has the function of receiving the key data generated in the data reproducing unit and enciphering the provided data read by the DVD 2 using the key data. A concrete configuration of the function is shown in FIG. 2.

A data reproducing unit 6 receives the provided data read by the DVD drive 4 via the computer unit (PC) 1 and performs reproducing and outputting processes. The data reproducing unit 6 may be referred to as an MPEG board. The MPEG board 6 is provided with a MPEG 2 decoder and obtains the reproduced output data by decoding the provided data compressed by the MPEG 2 scheme received via the computer unit (PC) 1. Moreover, the MPEG board 6 has the function of not only creating key data and sending the key data to the DVD drive 4 but also deciphering the provided data using the key data. A concrete configuration of the function is shown in FIG. 2.

In the configuration of FIG. 1, the MPEG board 6 not only issues the key data generated at the board 6 to the DVD drive 4, but also holds the key data as a deciphering key.

The DVD drive 4 generates an enciphering key using the key data and enciphers the provided data read by the DVD 2, and thereafter sends the enciphered data to the MPEG board 6 via the computer unit (PC) 1.

The MPEG board 6 receives the provided data enciphered by the DVD drive 4 via the computer unit (PC) 1 and decodes the enciphered data using the deciphering key.

Providing such a copy control mechanism enables only the MPEG board 6 having the key data used in enciphering to record and reproduce the data read by the DVD drive 4 as copied data.

Specifically, when the DVD drive 4 performs one type of enciphering on a type of (or a piece of) provided data, even if a plurality of data reproducing units are connected via a data transfer unit, those, except for the data reproducing unit having the key data used in enciphering, cannot reproduce the copied data.

In the concrete configuration, the key data sent from the MPEG board 6 to the DVD drive 4 is enciphered. In addition, in the concrete configuration, exclusive control of copying in the embodiment is selectively effected according to the copy permission data (CGMS). As a concrete example, in FIG. 7, when b0 and b1 in the CGMS are "01," the aforementioned exclusive control of copying is possible.

FIG. 2 is a block diagram showing a system configuration in a second embodiment of the present invention. The second embodiment realizes a system having the function of, according to the copy permission data (CGMS) recorded on a large capacity recording medium, selectively switching between the copy permission level of copy free, at which all of the data reproducing units are allowed to reproduce the copied data obtained by once recording the provided data read by the drive, the level at which only a specific data reproducing unit is allowed to reproduce the copied data, and the level at which none of the data reproducing units are allowed to reproduce the copied data.

In FIG. 2, reference symbols 10 and 10A indicate the component parts corresponding to the computer unit (PC) 1 shown in FIG. 1. A CPU 10 of a computer body supervises control of the entire system. 10A indicates a system bus for the entire system. Under the control of the CPU 10, the copy control processing as shown in FIGS. 3 to 6 is executed. The CPU 10 selectively takes in the provided data permitted to copy read by a drive unit 40 from a data recording medium 20, stores it in a storage unit 30, and enables processes, including editing and correction.

A data recording medium 20 corresponds to a DVD 2. On the data recording medium, not only the provided data is compressed and recorded by the MPEG 2 scheme, but also the copy permission data (CGMS), as shown in FIG. 7, is recorded in part of the media file management data block so as to correspond to the provided data.

A storage unit 30 corresponds to the external storage unit 3 of FIG. 1. The storage unit is used to store, edit, and correct the copied data.

A drive unit 40 corresponds to the DVD drive 4 of FIG. 1. The drive unit 40 reads the data from the data recording medium 20. The drive unit 40 comprises cipher generator units 41, 44, registers 42, 43, 45, 48, 51 for storing an enciphering key, a reading unit 46, enciphering units 47, 49, and a deciphering unit 50.

The cipher generator unit 41 generates an enciphering key (1) on the basis of a random value obtained from a random number generator.

The register 42 holds the enciphering key (1) generated by the cipher generator unit 41. The register 43 holds the enciphering key (2) received from a reproducing unit 60 via the system bus 10A.

The cipher generator unit 44 generates an enciphering key (3) using the enciphering key (1) and enciphering key (2). The register 45 holds the enciphering key (3) generated by the cipher generator unit 44.

The reading unit 46 reads the data recorded on the data recording medium 20. Here, the reading unit reads not only the provided data, such as movies or music, the object of copy control, but also the copy permission data (CGMS) as shown in FIG. 7, indicating the copy permission level of the provided data.

According to the copy permission data (CGMS), the enciphering unit 47 enciphers the provided data read from the data recording medium 20 using the enciphering key (3) stored in the register 45 or the provided data enciphering key (5) stored in the register 51, or sends the provided data without enciphering it, to the reproducing unit 60 via the system bus 10A.

The register 48 holds the copy permission data (CGMS) read from the data recording medium 20. The enciphering unit 49 enciphers the copy permission data (CGMS) stored in the register 48 and sends the enciphered data to the reproducing unit 60 via the system bus 10A.

The deciphering unit 50 deciphers the enciphered provided data using the enciphering key (5), unique to the unit, received from the enciphering unit 70. The register 51 holds the enciphering key (5) deciphered by the deciphering unit 50.

A unit 60 reproduces the provided data and corresponds to the MPEG board 6. The reproducing unit 60 includes an MPEG decoder and obtains the reproduced output data by decoding the provided data compressed by the MPEG 2 scheme received via the system bus 10A. Here, the reproducing unit comprises cipher generator units 61, 64, registers 62, 63, 65, 69, 71, 72 for storing enciphering keys, deciphering units 66, 67, an MPEG 2 decoder 68, and an enciphering unit 70.

The cipher generator unit 61 generates an enciphering key (2) on the basis of a random value obtained from a random number generator.

The register 62 holds the enciphering key (1) received from drive unit 40 via the system bus 10A. The register 63 holds the enciphering key (2) generated at the cipher generator unit 61.

The cipher generator unit 64 generates an enciphering key (4) using the enciphering key (1) and enciphering key (2).

The register 65 holds the enciphering key (4) generated by the cipher generator unit 64.

The deciphering unit 66 decodes the enciphered copy permission data (CGMS) received from the drive unit 40 via the system bus 10A in the computer body.

According to the copy permission data (CGMS) stored in the register 71, the deciphering unit 67 deciphers the provided data received from the drive unit 40 via the system bus 10A in the computer body, using the enciphering key (4) stored in the register 65 or the provided data deciphering key (6) stored in the register 72, or sends the provided data without deciphering it, to the MPEG 2 decoder 68.

The MPEG 2 decoder 68 decodes the provided data deciphered at the deciphering unit 67 and sends to the controller 80 the provided data that can be reproduced and outputted.

The register 69 holds the provided data enciphering key (5) which is unique to the unit. The enciphering unit 70 enciphers the provided data enciphering key (5), unique to the unit, stored in the register 69 and sends the enciphered data to the drive unit 40.

The register 71 holds the copy permission data (CGMS) deciphered at the deciphering unit 66.

The register 72 holds the provided data deciphering key (6) paired with the provided data enciphering key (5) (e.g., both the keys have values in common), unique to the unit, stored in the register 69.

A display controller 80 displays the provided data outputted from the MPEG 2decoder 68 on a display unit 81.

The key values in the registers 45, 65 are cleared once, at least at the beginning or end of reproduction, and are rewritten. The key values in the registers 69, 72 may be rewritten at the beginning of reproduction, for example, instead of being fixed values.

Figure 3:
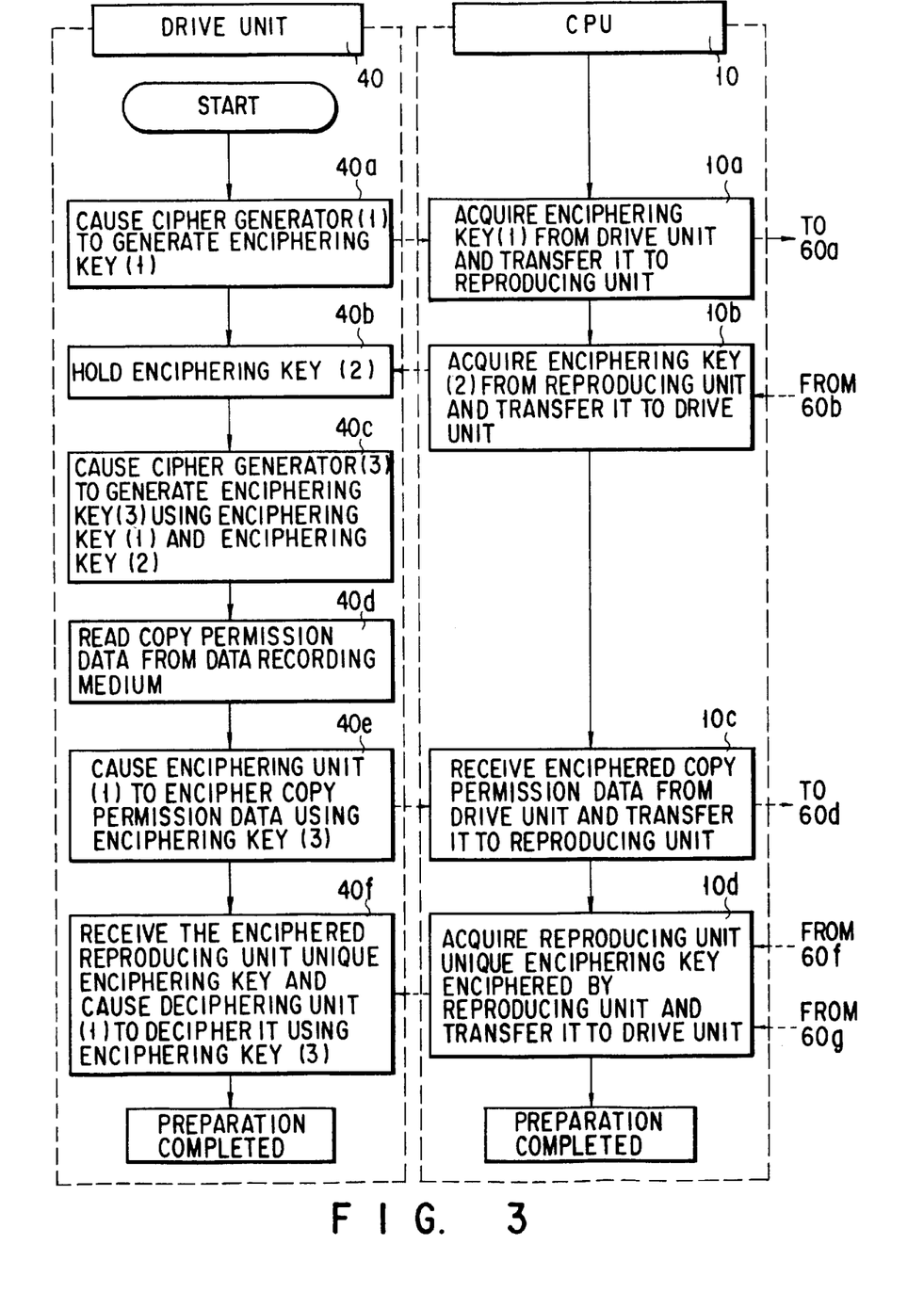
FIG. 3 is a flowchart for the processing sequence in the second embodiment of the present invention.
Figure 4:
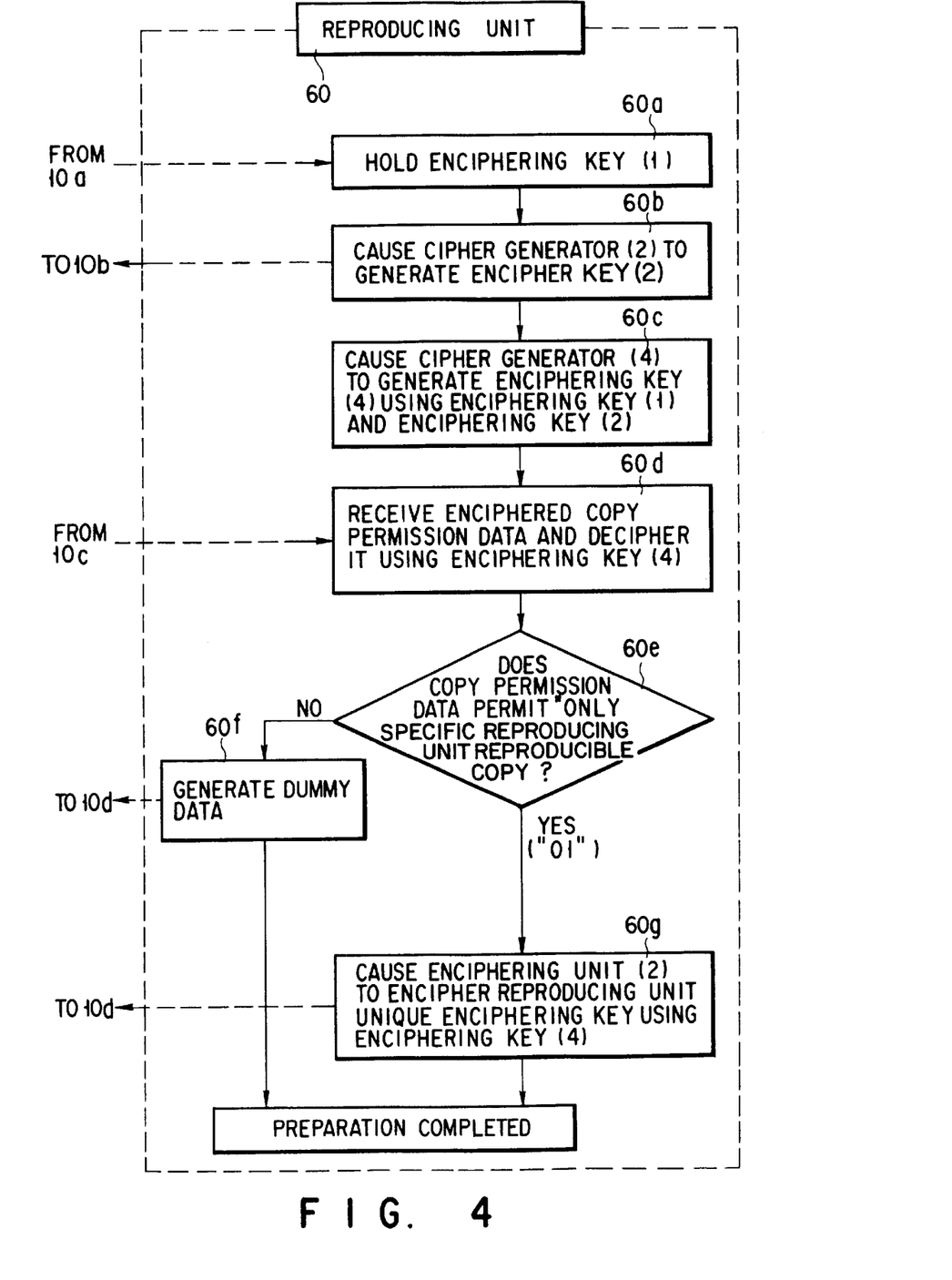
FIG. 4 is a flowchart for the processing sequence in the second embodiment of the present invention.
Figure 5:
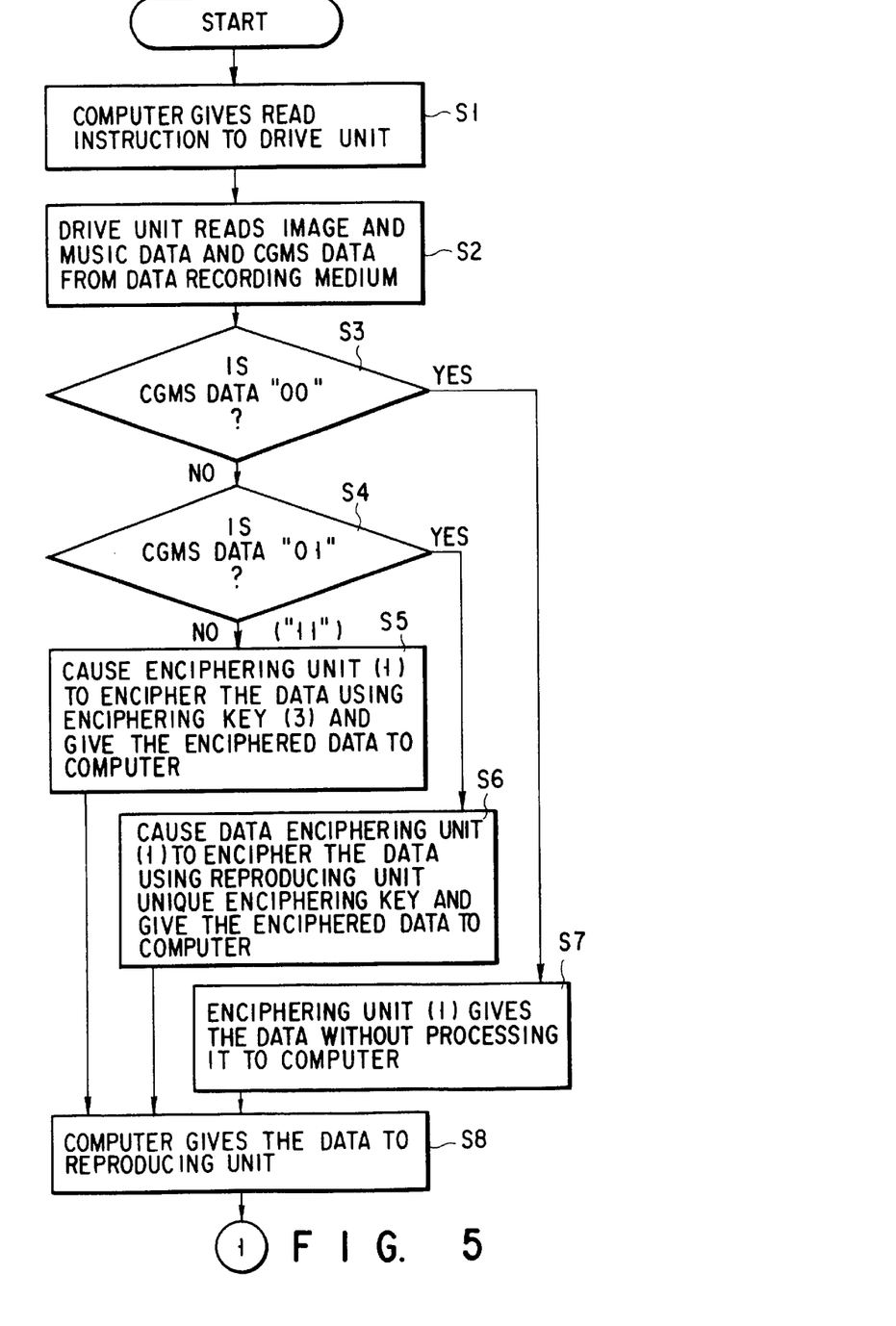
FIG. 5 is a flowchart for the processing sequence in the second embodiment of the present invention.
Figure 6:
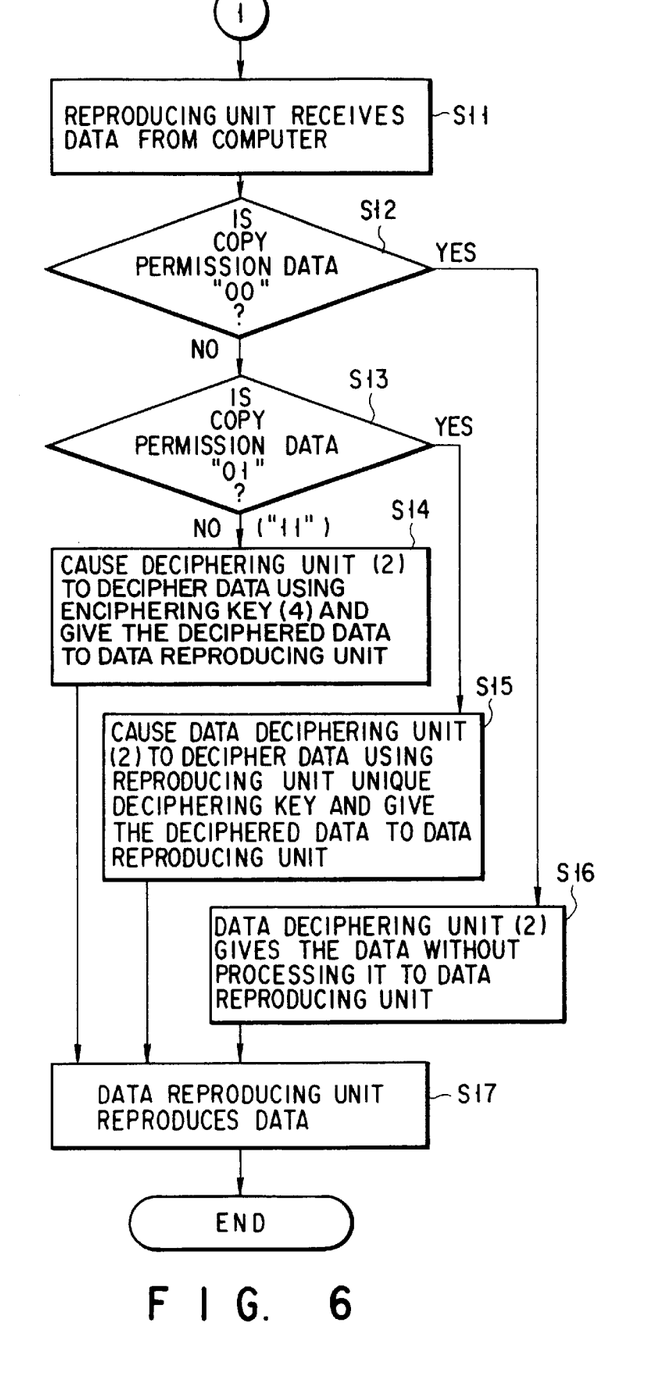
FIG. 6 is a flowchart for the processing sequence in the second embodiment of the present invention.

FIGS. 3 to 6 are flowcharts showing the processing sequence in the second embodiment of the present invention. FIGS. 3 and 4 are flowcharts showing the sequence of setting various types of key data for the enciphering and deciphering processes. FIGS. 5 and 6 are flowcharts showing the copy control processing sequence for reading the provided data.

FIG. 7 illustrates a data format to help explain the copy permission data (CGMS) in the media file management data block recorded on the data recording medium 20. Here, when b0, b1 in the CGMS are "00," all of the reproducing units 60 are allowed to reproduce the copied data; when b0, b1 are "01," only the reproducing unit used in reading the provided data is allowed to reproduce the copied data exclusively; and when b0, b1 is "11," none of the reproducing units is allowed to reproduce the provided data.

Now, the operation of the second embodiment of the present invention will be described by reference to FIGS. 2 to 7.

First, the process of setting various types of key data for the enciphering and deciphering processes will be described by reference to the flowcharts shown in FIGS. 3 and 4.

As a result of system start-up by a reproduction instruction, the cipher generator unit 41 in the drive unit 40 generates the enciphering key (1) on the basis of a random value (step 40a in FIG. 3).

The enciphering key (1) generated by the cipher generator unit 41 is not only stored in the register 42 but also set in the register 62 in the reproducing unit 60 under the control of the CPU 10 (step 10a in FIG. 3 and step 60a in FIG. 4).

The cipher generator unit 61 in the reproducing unit 60 generates an enciphering key (2) on the basis of a random value (step 60b in FIG. 4).

The enciphering key (2) generated at the cipher generator unit 61 is not only stored in the register 63 but also set in the register 43 in the drive unit 40 under the control of the CPU 10 (steps 10b and 40b in FIG. 3).

The cipher generator unit 44 in the drive unit 40 generates an enciphering key (3) using the enciphering key (1) stored in the register 42 and the enciphering key (2) stored in the register 43 and then sets it in the register 45 (step 40c in FIG. 3).

The cipher generator unit 64 in the reproducing unit 60 generates an enciphering key (4) using the enciphering key (1) stored in the register 62 and the enciphering key (2) stored in the register 63 and then sets it in the register 65 (step 60c in FIG. 4).

The reading unit 46 in the drive unit 40 reads the copy permission data (CGMS) from the data recording medium 20 and sets it in the register 48 (step 40d in FIG. 3).

The enciphering unit 49 enciphers the copy permission data (CGMS) set in the register 48, using the enciphering key (3) stored in the register 45 (step 40e in FIG. 3). The enciphered copy permission data (CGMS) is given to the deciphering unit 66 in the reproducing unit 60 under the control of the CPU 10 (step 10c in FIG. 3).

The deciphering unit 66 deciphers the enciphered copy permission data (CGMS) received from the drive unit 40, using the enciphering key (4) stored in the register 65, and then sets it in the register 71 (step 60d in FIG. 4).

The control unit (not shown) in the reproducing unit 60 determines the contents of the copy permission data (CGMS) stored in the register 71. When determining that b0, b1 in the copy permission data (CGMS) are "01" and therefore recognizing that only the reproducing unit used in reading the provided data is allowed to reproduce the copied data exclusively, the control unit starts up the enciphering unit 70 (step 60e (Yes) in FIG. 4).

Then, the enciphering unit 70 enciphers the provided data enciphering key (5) unique to the unit fixedly stored in the register 69, using the enciphering key (4) stored in the register 65 (step 60g in FIG. 4).

When b0, b1 in the copy permission data (CGMS) are not "01," dummy data (a null value) is generated in place of the provided data enciphering key (5) (step 60f in FIG. 4).

The CPU 10 transfers the enciphered provided data enciphering key (5), unique to the unit, or the dummy data substituting for that key to the deciphering unit 50 in the drive unit 40 (step 10d in FIG. 3).

The deciphering unit 50 deciphers the enciphered provided data enciphering key (5), unique to the unit, received from the reproducing unit 60 and then sets the deciphered data in the register 51.

The above process completes the process of setting various types of key data for the enciphering and deciphering processes.

Next, the copy control process in reading the provided data will be described by reference to the flowcharts in FIGS. 5 and 6.

The CPU 10 gives the drive unit 40 an instruction to read the provided data (step S1 in FIG. 5).

Receiving a read instruction from the CPU 10, the control unit (not shown) in the drive unit 40 starts up the reading unit 46. The reading unit 46 provides drive control of the data recording medium 20 and reads the provided data (MPEG 2 data) and the copy permission data (CGMS) from the data recording medium 20 (step S2 in FIG. 5).

The copy permission data (CGMS) read from the data recording medium 20 is stored in the register 48 and then is supplied to the enciphering unit 47.

The enciphering unit 47 determines the contents of the copy permission data (CGMS) stored in the register 48. When determining that b0, b1 in the CGMS are "00," the enciphering unit outputs (passes) the provided data directly without enciphering the provided data. When they are "01," the enciphering unit enciphers the provided data using the provided data enciphering key (5), unique to the unit, stored in the register 51. When they are "11," the enciphering unit enciphers the provided data using the enciphering key (3) stored in the register 45 (steps S3 to S7 in FIG. 5).

The provided data (MPEG 2 data) outputted from the enciphering unit 47 is transferred to the deciphering unit 67 in the reproducing unit 60 via the system bus 10A (step S8 in FIG. 5).

When receiving the provided data (MPEG 2 data) from the enciphering unit 47 in the drive unit 40, the deciphering unit 67 in the reproducing unit 60 determines the contents of the copy permission data (CGMS) stored in the register 71. When determining that b0, b1 in the CGMS are "00," the deciphering unit outputs (passes) the provided data directly without deciphering the provided data. When they are "01," the deciphering unit deciphers the provided data using the provided data enciphering key (6), unique to the unit, stored in the register 72. When they are "11," the deciphering unit deciphers the provided data using the enciphering key (4) stored in the register 65 (steps S11 to S16 in FIG. 6).

The provided data (MPEG 2 data) outputted from the deciphering unit 67 is decoded by the MPEG 2 decoder 68. Then, the decoded data is sent to the display controller 80 and is displayed on the display unit 81 (step S17 in FIG. 6).

In this case, when b0, b1 in the copy permission data (CGMS) are "00," the CPU 10 can reproduce and output the copied data arbitrarily, without specifying a reproducing unit, by loading the provided data (MPEG 2 data) into the storage unit 30.

When b0, b1 in the copy permission data (CGMS) are "01," loading the provided data (MPEG 2 data) into the storage unit 30 enables only the reproducing unit 60 having the provided data enciphering key (6), unique to the unit, paired with the provided data enciphering key (5), unique to the unit, used in the enciphering process to reproduce the copied data.

In this case, when the copied data, together with the enciphering key (6) stored in the register 72, is stored in the storage unit 30, the corresponding copied data can be reproduced by reading the stored key data and resetting it in the register 72, even if the key value in the register 72 is rewritten in a later reproducing process.

When b0, b1 in the copy permission data (CGMS) is "11," the copied data cannot be deciphered because the value of the enciphering key (4) has already changed at the time of reproduction, even if the provided data (MPEG 2 data) is loaded as the copied data into the storage unit 30. As a result, none of the reproducing units can reproduce the copied data.

By setting new key values in the registers 69, 72 or the registers 45, 65 each time the contents of the copy permission data (CGMS) are changed, a highly reliable copy protection mechanism enabling accurate permission control on a given data amount basis can be implemented.

As described above, with the configuration that enables each item of the provided data (each title of the movies or music) to be enciphered and prevents a computer or the like from reading the data easily, highly reliable copy control of provided data most suitable for computer processing is established.

Since only the data reproducing unit used in reading is allowed to reproduce a copy of the data read by a computer or the like, this enables authorized use of the copied data and prevents unauthorized use of the copied data.

Figure 8:
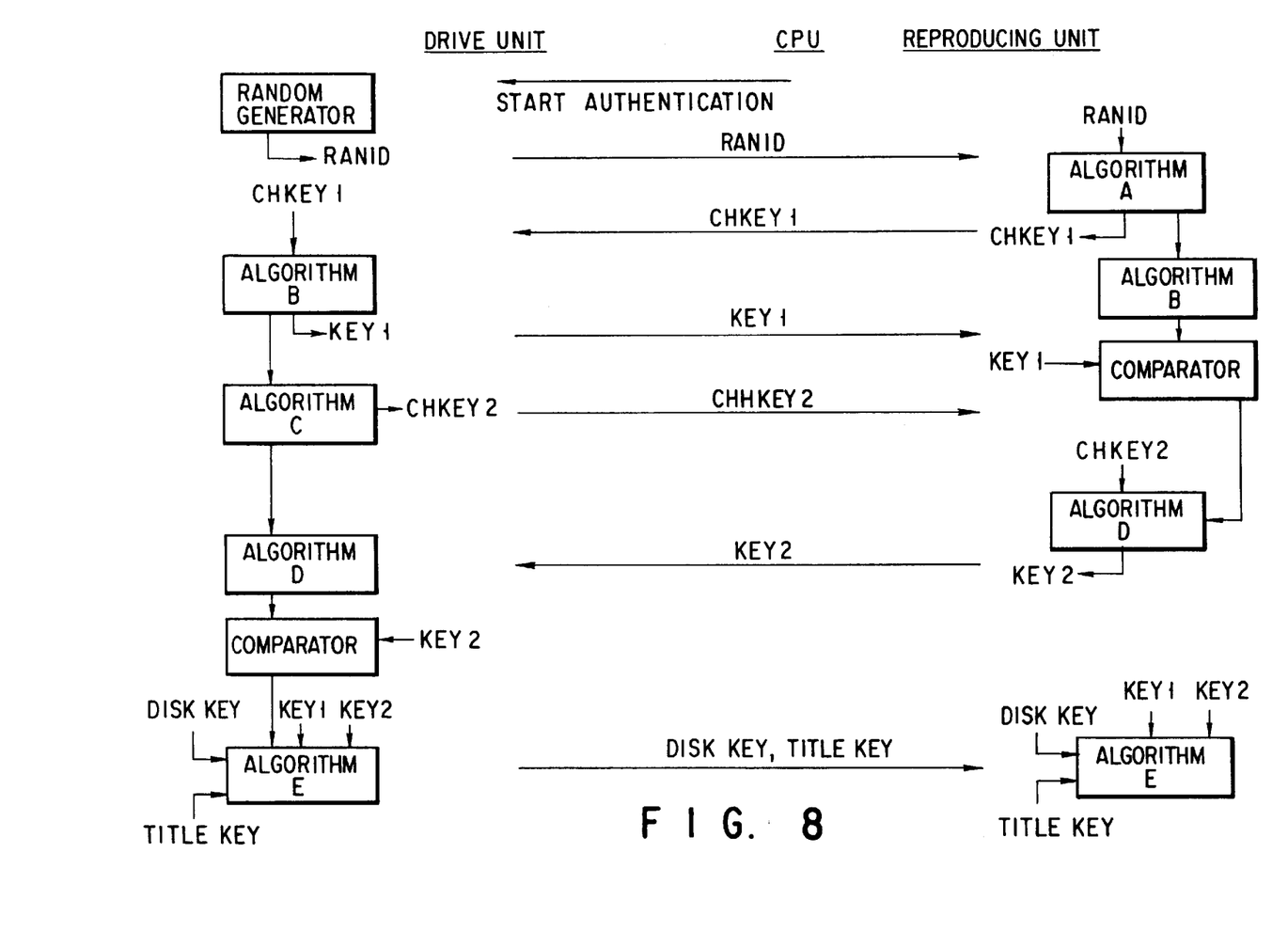
FIG. 8 is a conceptual diagram to help explain the way that the drive unit, CPU, and reproducing unit exchange various types of data for encoding and decoding data transferred between them in a third embodiment of the present invention.
Figure 9:
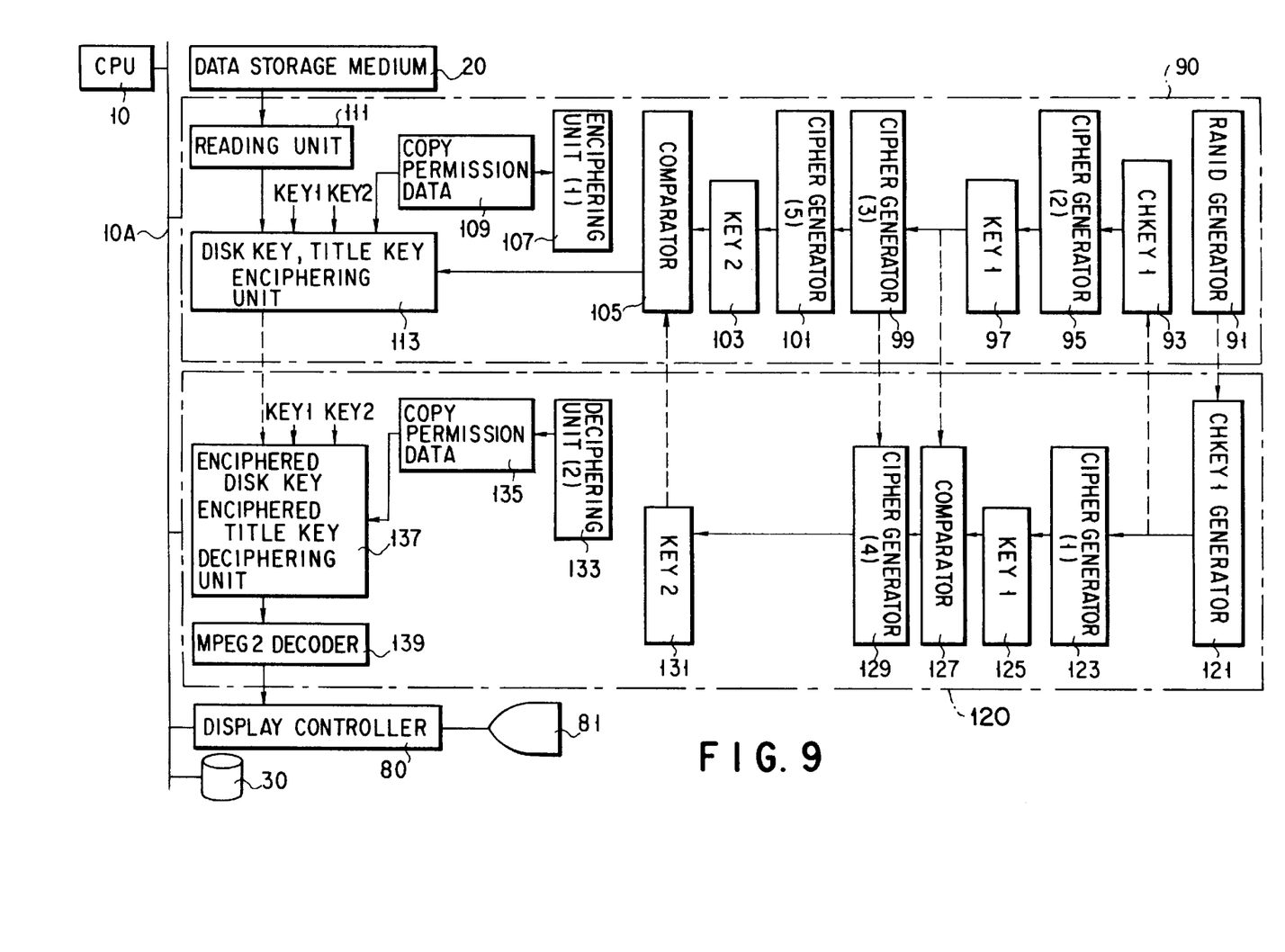
FIG. 9 is a system block diagram in the third embodiment of the present invention.
Figure 10:
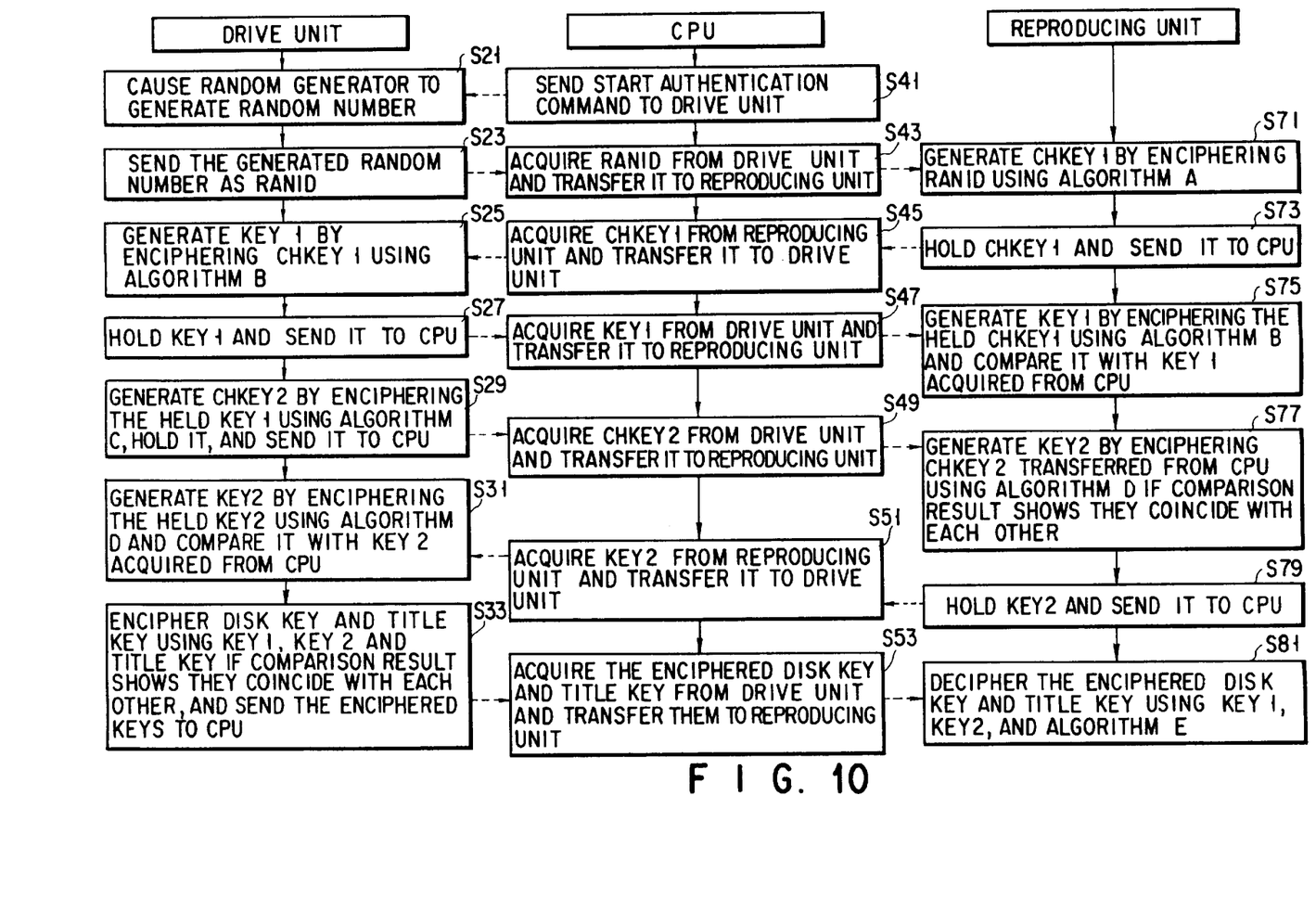
FIG. 10 is a flowchart showing the way that the drive unit, CPU, and reproducing unit exchange various types of data for encoding and decoding between them in the third embodiment of the present invention.

Hereinafter, a third embodiment of the present invention will be explained by reference to FIGS. 8 to 10.

First, a CPU 10 sends a "START AUTHENTICATION" command to a drive unit 90 (step S41). In response to the "START AUTHENTICATION" command, the RANID generator unit in the drive unit 90 causes a random generator to generate a random number and to send the generated random number as RANID to the CPU 10 (steps S21, S23). The RANID is an ID for identifying one MPEG board, when there are a plurality of MPEG boards acting as reproducing units, for example. The CPU 10 acquires the RANID from the drive unit 90 and sends it to the reproducing unit 120. The reproducing unit 120 causes a CHKEY 1 generator unit 121 to encipher the RANID using algorithm A, generate CHKEY 1, hold it, and send it to the CPU 10 (steps S71, S73). The CHKEY 1 is a key for identifying an MPEG board or a disk drive unit. The CPU 10 acquires the CHKEY 1 from the reproducing unit 120 and transfers it to the drive unit 90 (step S45). The drive unit 90 causes an enciphering unit 95 to encipher the CHKEY 1 using algorithm B, generate KEY 1, hold it, and send it to the CPU 10 (steps S25, 27). The CPU 10 acquires the KEY 1 from the drive unit 90 and transfers it to the reproducing unit 120. The reproducing unit 120 causes a cipher generator unit 123 to encipher the held CHKEY 1 using algorithm B, generate KEY 1, and compare it with the KEY 1 acquired from the CPU. If the comparison result shows that they coincide with each other, this means that the authentication of the drive unit by the reproducing unit has finished correctly.

Furthermore, the drive unit 90 causes the cipher generator unit 99 to encipher the held KEY 1 using algorithm C, generate KEY 2, hold it, and send it to the CPU (step, S29). The CPU 10 acquires the CHKEY 2 from the drive unit 90 and transfers it to the reproducing unit 120. If the comparison result at step S75 shows that they coincide with each other, the reproducing unit 120 causes the cipher generator unit 129 to encipher the CHKEY 2 sent from the CPU using algorithm D, generate KEY 2, hold the KEY 2, and send it to the CPU 10. The CPU 10 acquires the KEY 2 from the reproducing unit 120 and transfers it to the drive unit (step S49). The drive unit causes the cipher generator unit 101 to encipher the held KEY 2 using algorithm D and generate KEY 2 and causes a comparison circuit 105 to compare the KEY 2 with the KEY 2 acquired from the CPU (steps S29, S3 1). If the comparison result shows that they coincide with each other, this means that the drive unit has authenticated the reproducing unit properly. As a result, the mutual authentication between the drive unit and the reproducing unit has been completed. Then, the drive unit causes the enciphering unit 113 to encipher the DISK KEY (for identifying a disk) and the TITLE KEY (for identifying each of the titles) using the KEY 1, KEY 2, and algorithm E and send the enciphered data to the CPU (step S33). The CPU acquires the enciphered DISK KEY and TITLE KEY from the drive unit and sends it to the reproducing unit (step S51). The reproducing unit causes the deciphering unit 137 to decipher the enciphered DISK KEY and TITLE KEY using the KEY 1, KEY 2, and algorithm E. Explanation of the copy permission data will not be given, because it is the same as in the second embodiment.

As described above, with the embodiment of the present invention, it is possible to construct a highly reliable system which allows a side having a medium to control use of copy arbitrarily on a provide data basis without showing the key data used in enciphering and deciphering to a computer unit, even in a system where the computer unit intervenes in the exchange of data supplied from a large capacity recording medium or the like, and which always enables use of the provided data through authorized copying.

While in the embodiment, a large capacity disk, such as a DVD or a CD-ROM, requiring a drive unit has been taken as an example of a data providing medium, the present invention may be applied to a system configuration where a data providing medium is provided externally via, for example, a communication channel, in the same manner as in the above embodiment. This configuration can be implemented easily by providing an external data providing unit that communicates with the individual component parts of the drive unit 40, except for the reading unit in FIG. 2, and by replacing the signal paths represented by broken lines in FIG. 2 with communication paths.

While in the embodiment, the copy permission data (CGMS) and the provided data enciphering key (5), unique to the unit, are enciphered and then transferred, they are not necessarily enciphered. They may not be enciphered, depending on the degree of reliability required.

While in the second embodiment, the drive unit 40 and reproducing unit 60 each generate the primary key data on the basis of random data, the present invention is not restricted this. For instance, at least either the drive unit 40 or the reproducing unit 60 may generate the primary key data on the basis of random data, and on the basis of the primary key data, the drive unit 40 and reproducing unit 60 each generate temporary secondary key data by themselves. The essential thing is that the drive unit and data reproducing unit have only to temporarily generate the mutually related key data using random data.

Furthermore, while in the embodiment, the provided data enciphering key (5), unique to the unit, and the provided data deciphering key (6), unique to the unit, are provided independently in the reproducing unit 60 and are stored in the registers 69 and 79 separately, the present invention is not limited to this. For instance, common key data may be used for both the provided data enciphering key (5) and deciphering key (6), unique to the unit. The essential thing is that the reproducing unit 60 has only to grasp the enciphering scheme of the inputted provided data and the contents of the enciphering key in order to decipher the inputted provided data.

Still furthermore, while in the second embodiment, the copy control mechanism permits a first generation copy in such a manner that only the reproducing unit 60 having the provided data enciphering key (6), unique to the unit, paired with the provided data enciphering key (5), unique to the unit, used in enciphering is allowed to reproduce the copy, and the copy control mechanism which prevents all of the reproducing units from reproducing the copy are used selectively, the present invention is not limited to this. For instance, the copy permission modes may be combined arbitrarily as follows: the copy permission mode of free copy and the copy permission mode that prevents all of the reproducing units from reproducing the copy may be combined; or the copy permission mode of free copy and the copy permission mode of first generation copy may be combined.

Still furthermore, while in the embodiments, the system in which a computer intervenes in the exchange of the data provided from a large capacity recording medium, communication medium, or the like has been used, the present invention is not restricted to this, but may be applied to a system configuration in which a computer does not intervene directly in the exchange of the provided data. For instance, the copy control mechanism may be applied to the interface section between units capable of reproducing the provided data, between a drive that reads the provided data from an MD, a CD-ROM, or a DVD, or a communication medium having the function of transmitting the provided data, and a unit that reproduces the read-out data.

Still furthermore, while in the embodiments, the provided data, such as movies or music, compressed by the MPEG 2 standard has been used, the present invention is not limited to this. For instance, the present invention may be applied to a system configuration capable of reproducing the data compressed by the MPEG 1 or MPEG 4 standard.

While in the embodiments, the provided data recorded on the recording medium was raw data, all of the provided data may be enciphered and recorded on a recording medium or only part of the provided data may be enciphered and recorded on a recording medium.

What is claimed is:

1. A data copy control method applied to a computer system having a reproducing device which receives reproducing data read out by a drive device, said method comprising:
   producing a shared key in each of the drive device and the reproducing device;
   enciphering the reproducing data in the drive device using copy control data read out by the drive device and the shared key, and transferring the enciphered reproducing data and the copy control data to the reproducing device, the copy control data specifying a copy permission value; and
   deciphering the enciphered reproducing data using the copy control data received by the drive device and the shared key.

2. The method according to claim 1, wherein said producing comprises:
   producing a first key based on a first random value in the drive device, and transferring the produced first key to the reproducing device;
   producing a second key based on a second random value in the reproducing device, and transferring the produced second key to the drive device; and
   producing the shared key in each of the drive device and the reproducing device using the first and second keys produced and transferred.

3. The method according to claim 2, further comprising:
   producing a third key in the reproducing device, the third key being allocated to the reproducing device;
   enciphering the third key using the shared key in the reproducing device, and transferring the enciphered third key from the reproducing device to the drive device; and
   deciphering the enciphered third key using the shared key in the drive device,
   wherein said enciphering the reproducing data in the drive device uses the deciphered third key when the copy control data read out by the drive device designates the reproducing device as a specific reproducing device allowed to reproduce the reproducing data, and
   wherein said deciphering the enciphered reproducing data uses the produced third key.

4. A data copy control apparatus for a computer system, said apparatus comprising:
   a drive device to read reproducing data;
   a reproducing device to reproduce the read reproducing data;

a shared key producing mechanism to produce a shared key in each of the drive device and the reproducing device;

an enciphering mechanism to encipher the reproducing data read out by the drive device using copy control data read out by the drive device and the shared key, the copy control data specifying a copy permission value;

a transferring mechanism to transfer the enciphered reproducing data and the copy control data to the reproducing device; and a deciphering mechanism to decipher the enciphered data using the copy control data received by the reproducing device and the shared key.

5. The apparatus according to claim 4, wherein said shared key producing mechanism comprises:

a first producing mechanism to produce a first key based on a first random value in the drive device;

a second producing mechanism to produce a second key based on a second random value in the reproducing device;

an exchanging mechanism to exchange the first and second keys between the drive device and the reproducing device; and a third producing mechanism to produce the shared key in each of the drive device and the reproducing device using the first and second keys produced and exchanged.

6. The apparatus according to claim 5, further comprising:

a fourth producing mechanism to produce a third key in the reproducing device, the third key being allocated to the reproducing device;

a second enciphering mechanism to encipher the third key using the shared key in the reproducing device, a second transferring mechanism to transfer the enciphered third key from the reproducing device to the drive device; and a second deciphering mechanism to decipher the enciphered third key using the shared key in the drive device, wherein said enciphering mechanism enciphers the reproducing data in the drive device using the deciphered third key when the copy control data read out by the drive device designates the reproducing device as a specific reproducing device allowed to reproduce the reproducing data, and wherein said deciphering mechanism deciphers the enciphered reproducing data using the produced third key.

7. A data copy control method applied to a computer system having a reproducing device which receives reproducing data read out by a drive device, said method comprising:

producing a first key based on a first random value in the drive device;

producing a second key based on a second random value in the reproducing device;

exchanging the first and second keys between the drive device and the reproducing device;

producing a shared key in each of the drive device and the reproducing device using the first and second keys produced and exchanged;

producing, in either the drive device or the reproducing device, a third key for use with copy permission data to be transferred between the drive device and the reproducing device;

enciphering the third key using the shared key, and transferring the enciphered third key to either the drive device or the reproducing device; and deciphering the enciphered third key using the shared key in one of the drive device and the reproducing device having received the enciphered third key.

8. A data copy control apparatus for a computer system having a reproducing device which receives reproducing data read out by a drive device, said apparatus comprising:

a first producing mechanism to produce a first key based on a first random value in the drive device;

a second producing mechanism to produce a second key based on a second random value in the reproducing device;

an exchanging mechanism to exchange the first and second keys between the drive device and the reproducing device;

a third producing mechanism to produce a shared key in each of the drive device and the reproducing device using the first and second keys produced and exchanged;

a fourth producing mechanism to produce, in either the drive device or the reproducing device, a third key for use with copy permission data to be transferred between the drive device and the reproducing device;

an enciphering mechanism to encipher the third key using the shared key;

a transferring mechanism to transfer the enciphered third key to either the drive device or the reproducing device; and a deciphering mechanism to decipher the enciphered third key using the shared key in one of the drive device and the reproducing device having received the enciphered third key.

9. A data copy control method applied to a system having a reproducing device which receives data read out by a drive device, said method comprising:

producing at least one shared key in each of the drive device and the reproducing device;

enciphering copy control data read out by the drive device using one of the at least one shared key, and transferring the enciphered copy control data to the reproducing device, the copy control data specifying a copy permission value; and deciphering the enciphered copy control data received by the reproducing device using the one of the at least one shared key.

10. The method according to claim 9, wherein said producing comprises:

producing a first key based on a first random value in the drive device;

producing a second key based on a second random value in the reproducing device;

exchanging the first and second keys between the drive device and the reproducing device; and producing the at least one shared key in each of the drive device and the reproducing device using the first and second keys produced and exchanged.

11. A data copy control apparatus for a system having a reproducing device which receives data read out by a drive device, said apparatus comprising:

a producing mechanism to produce at least one shared key in each of the drive device and the reproducing device;

an enciphering mechanism to encipher copy control data read out by the drive device using one of the at least one shared key, the copy control data specifying a copy permission value;

a transferring mechanism to transfer the enciphered copy control data to the reproducing device; and a deciphering mechanism to decipher the enciphered copy control data received by the reproducing using the one of the at least one shared key.

12. The apparatus according to claim 11, wherein said producing mechanism comprises:

a first producing mechanism to produce a first key based on a first random value in the drive device;

a second producing mechanism to produce a second key based on a second random value in the reproducing device;

an exchanging mechanism to exchange the first and second keys between the drive device and the reproducing device; and a third producing mechanism to produce a first shared key in each of the drive device and the reproducing device using the first and second random keys produced and exchanged.

13. A data copy control method applied to a computer system having a reproducing device which receives reproducing data read out by a drive device, said method comprising:

producing identification data for the reproducing device in the drive device in response to receiving an authentication request;

executing first authentication between the drive device and the reproducing device, said executing first authentication comprising producing a first challenge key based on the reproduced identification data in the reproducing device, and transferring the first challenge key to the drive device, producing a first key based on the first challenge key in each of the drive device and the reproducing device, and transferring the first key from the drive device to the reproducing device; executing second authentication between the drive device and the reproducing device based on the produced identification data, said executing second authentication comprising producing a second challenge key based on the produced first key in the drive device, and transferring the first challenge key to the reproducing device, producing a second key based on the second challenge key in each of the drive device and the reproducing device, and transferring the second key from the reproducing device to the drive device; enciphering a disk key and a title key read out by the drive device using the first key and the second key, and transferring the enciphered disk key and title key to the reproducing device; and deciphering the enciphered disk key and title key using the first key and the second key.

* * * * *